United States Patent
Li et al.

(10) Patent No.: US 12,032,697 B2
(45) Date of Patent: Jul. 9, 2024

(54) PROGRAM VERIFICATION METHOD AND APPARATUS, PLATFORM, USER TERMINAL, AND ONLINE SERVICE SYSTEM

(71) Applicant: CLOUDMINDS ROBOTICS CO., LTD., Shanghai (CN)

(72) Inventors: Qiang Li, Shanghai (CN); Hui Xie, Shanghai (CN); Yueyang Zhang, Shanghai (CN)

(73) Assignee: CLOUDMINDS ROBOTICS CO., LTD., Shanghai (CN)

( * ) Notice: Subject to any disclaimer, the term of this patent is extended or adjusted under 35 U.S.C. 154(b) by 289 days.

(21) Appl. No.: 17/562,893

(22) Filed: Dec. 27, 2021

(65) Prior Publication Data

US 2022/0215098 A1 Jul. 7, 2022

Related U.S. Application Data

(63) Continuation of application No. PCT/CN2020/137383, filed on Dec. 17, 2020.

(30) Foreign Application Priority Data

Oct. 28, 2020 (CN) .......................... 202011176393.3

(51) Int. Cl.
*G06F 21/00* (2013.01)
*G06F 21/44* (2013.01)
*G06F 21/57* (2013.01)

(52) U.S. Cl.
CPC .............. *G06F 21/57* (2013.01); *G06F 21/44* (2013.01)

(58) Field of Classification Search
CPC ........ G06F 21/57; G06F 21/44; G06F 21/604; G06F 21/645; G06F 21/64; Y02D 10/00; H04L 63/08
See application file for complete search history.

(56) References Cited

U.S. PATENT DOCUMENTS 11,151,276 B1 * 10/2021 Wang ..................... G06Q 20/02
11,165,827 B2 11/2021 Bender et al.
(Continued)

FOREIGN PATENT DOCUMENTS

CN 109033818 A 12/2018
CN 110445612 A 11/2019
(Continued)

OTHER PUBLICATIONS

International Search Report dated Jul. 30, 2021 as received in application No. PCT/CN2020/137383.
(Continued)

*Primary Examiner* — Kendall Dolly
(74) *Attorney, Agent, or Firm* — Maschoff Brennan

(57) ABSTRACT

The present disclosure relates to a program verification method and apparatus, a platform, a user terminal, and an online service system, includes: acquiring a root evidence of a server-side program from a blockchain network, and acquiring a verification evidence of the server-side program from a server side, where the root evidence is written into the blockchain network after server-side program review succeeds, and the success of the server-side program review indicates a data processing method of the server-side program satisfies a preset data processing rule; verifying whether the root evidence and the verification evidence are matched, where the root evidence and the verification evidence being matched indicates the server-side program is a program that is operated in a TEE of a computer and is not modified after the root evidence is written into the blockchain network; and determining to connect a user-side program to the server-side program.

10 Claims, 4 Drawing Sheets

(56) References Cited

U.S. PATENT DOCUMENTS

| | | | |
|---|---|---|---|
| 11,733,991 B2 | 8/2023 | Zhang et al. | |
| 2019/0036711 A1 | 1/2019 | Qiu | |
| 2019/0306147 A1* | 10/2019 | Uhr | H04L 9/3263 |
| 2019/0342290 A1* | 11/2019 | Mittal | H04L 63/083 |
| 2020/0117367 A1 | 4/2020 | Zhou | |
| 2020/0167779 A1* | 5/2020 | Carver | G06Q 20/3829 |
| 2020/0257775 A1* | 8/2020 | Wright | G06Q 20/223 |
| 2020/0287901 A1* | 9/2020 | Avetisov | H04L 9/088 |
| 2020/0296093 A1* | 9/2020 | Hoyos | H04L 9/3247 |
| 2021/0352077 A1* | 11/2021 | Benedetti | H04L 9/3247 |
| 2022/0027260 A1* | 1/2022 | Thomas | G06F 9/541 |
| 2022/0237565 A1* | 7/2022 | Dzierzanowski | G06Q 10/103 |
| 2022/0311611 A1* | 9/2022 | Gaur | H04L 9/0847 |
| 2023/0179424 A1* | 6/2023 | McNamee | H04L 9/3239 |
| | | | 713/193 |

FOREIGN PATENT DOCUMENTS

| | | |
|---|---|---|
| CN | 110535938 A | 12/2019 |
| CN | 111193730 A | 5/2020 |
| CN | 111353903 A | 6/2020 |
| CN | 111641694 A | 9/2020 |
| JP | 2019-511761 A | 4/2019 |
| JP | 2020-072475 A | 5/2020 |
| KR | 20180036140 A | 4/2018 |
| KR | 10-2019-0111042 A | 10/2019 |
| WO | 2017/195160 A1 | 11/2017 |

OTHER PUBLICATIONS

Chinese Office Action dated Jul. 22, 2022 as received in appplication No. 202011176393.3.
European Search Report dated Sep. 6, 2022 as received in application No. 20941535.5.
Chinese Office Action dated Sep. 30, 2022 as received in appplication No. 202011176393.3.
CN Office Action dated Jan. 6, 2023 as received in Application No. 202011176393.3.
JP Office Action dated Feb. 14, 2023 as received in Application No. 2021-578193.
KR Office Action dated Mar. 5, 2023 as received in Application No. 10-2021-7043068.

* cited by examiner

PROGRAM VERIFICATION METHOD AND APPARATUS, PLATFORM, USER TERMINAL, AND ONLINE SERVICE SYSTEM

CROSS-REFERENCE TO RELATED APPLICATIONS

This application is a continuation of International Application No. PCT/CN2020/137383, filed on Dec. 17, 2020, the disclosure of which is hereby incorporated by reference in its entirety.

FIELD

The present disclosure relates to the field of online services, specifically to a program verification method and apparatus, a platform, a user terminal, and an online service system.

BACKGROUND

An online service system may provide users with various services, such as chatting, shopping, payment, and games, which greatly improves the convenience of users' daily life. However, some current online service systems have the problem of leakage of user information. It is difficult for service providers to self-certify that the service systems will not collect or leak user information, and it is also difficult for users to verify whether the service systems are confidential according to agreements, which results in that the user information security of the online service systems is not ensured.

SUMMARY

The present disclosure aims to provide a program verification method and apparatus, a platform, a user terminal, and an online service system, which have solved the above-mentioned technical problems.

In order to achieve the above objective, a first aspect of the present disclosure provides a program verification method, including: acquiring a root evidence of a server-side program from a blockchain network, and acquiring a verification evidence of the server-side program from a server side, where the root evidence is written into the blockchain network after server-side program review succeeds, and the success of the server-side program review at least indicates that a data processing method of the server-side program satisfies a preset data processing rule; verifying whether the root evidence and the verification evidence are matched, where the root evidence and the verification evidence being matched indicates that the server-side program is a program that is operated in a trusted execution environment (TEE) of a computer and is not modified after the root evidence is written into the blockchain network; and when the root evidence and the verification evidence are matched, determining to connect a user-side program to the server-side program.

Alternatively, the method further includes: acquiring a current abstract of the user-side program, and acquiring a pre-stored abstract of the user-side program from the blockchain network, where the pre-stored abstract is written into the blockchain network after user-side program review succeeds, and the success of the user-side program review at least indicates that a data acquisition method of the user-side program satisfies a preset data acquisition rule; and verifying whether the current abstract and the pre-stored abstract are matched, where the current abstract and the pre-stored abstract being matched indicates that the user-side program is a program that is not modified after the pre-stored abstract is written into the blockchain network; the when the root evidence and the verification evidence are matched, determining to connect a user-side program to the server-side program includes: when the current abstract and the pre-stored abstract are matched and the root evidence and the verification evidence are matched, determining to connect the user-side program to the server-side program.

In a second aspect, the present disclosure provides an online service system. The system includes a user terminal, a server side, and an authentication platform, where the authentication platform includes a blockchain network; the authentication platform is configured to perform server-side program review on a server-side program, and store, when the server-side program review succeeds, a root evidence of the server-side program into the blockchain network; the success of the server-side program review at least indicates that a data processing method of the server-side program satisfies a preset data processing rule; the authentication platform or the user terminal is configured to acquire the root evidence of the server-side program from the blockchain network, acquire a verification evidence of the server-side program from the server side, verify whether the root evidence and the verification evidence are matched, and determine, when the root evidence and the verification evidence are matched, to connect a user-side program to the server-side program; the user terminal is configured to operate the user-side program; the server side is configured to operate the server-side program, where the root evidence and the verification evidence being matched indicates that the server-side program is a program that is operated in a trusted execution environment (TEE) of a computer and is not modified after the root evidence is written into the blockchain network.

Alternatively, the authentication platform is further configured to perform user-side program review on the user-side program, and store, when the user-side program review succeeds, an abstract of the user-side program into the blockchain network as a pre-stored abstract; the success of the user-side program review at least indicates that a data acquisition method of the user-side program satisfies a preset data acquisition rule; the authentication platform or the user terminal is further configured to acquire the current abstract of the user-side program, acquire the pre-stored abstract of the user-side program from the blockchain network, verify whether the current abstract and the pre-stored abstract are matched, and determine, when the current abstract and the pre-stored abstract are matched and the root evidence and the verification evidence are matched, to connect the user-side program to the server-side program, where the current abstract and the pre-stored abstract being matched indicates that the user-side program is a program that is not modified after the pre-stored abstract is written into the blockchain network.

Alternatively, the user terminal includes a initiator which is configured to calculate the abstract of the user-side program, acquire the pre-stored abstract of the user-side program from the blockchain network, and verify whether the current abstract and the pre-stored abstract are matched, and launch, when the current abstract and the pre-stored abstract are matched, the user-side program in the user terminal.

Alternatively, the user-side program and the server-side program are connected through an encrypted transmitted channel.

In a third aspect, the present disclosure provides a program verification apparatus, including: an acquisition module configured to acquire a root evidence of a server-side program from a blockchain network, and acquire a verification evidence of the server-side program from a server side, where the root evidence is written into the blockchain network after server-side program review succeeds, and the success of the server-side program review at least indicates that a data processing method of the server-side program satisfies a preset data processing rule; a verification module configured to verify whether the root evidence and the verification evidence are matched, where the root evidence and the verification evidence being matched indicates that the server-side program is a program that is operated in a trusted execution environment (TEE) of a computer and is not modified after the root evidence is written into the blockchain network; and a connection module configured to, when the root evidence and the verification evidence are matched, determine to connect a user-side program to the server-side program.

Alternatively, the apparatus further includes: an abstract acquisition module configured to acquire a current abstract of the user-side program, and acquire a pre-stored abstract of the user-side program from the blockchain network, where the pre-stored abstract is written into the blockchain network after user-side program review succeeds, and the success of the user-side program review at least indicates that a data acquisition method of the user-side program satisfies a preset data acquisition rule; and an abstract authentication module configured to verify whether the current abstract and the pre-stored abstract are matched, where the current abstract and the pre-stored abstract being matched indicates that the user-side program is a program that is not modified after the pre-stored abstract is written into the blockchain network; the connection module is configured to, when the current abstract and the pre-stored abstract are matched and the root evidence and the verification evidence are matched, determine to connect the user-side program to the server-side program.

In a fourth aspect, the present disclosure provides an authentication platform which includes a memory and a processor. The memory stores a computer program, and the processor is configured to execute the computer program in the memory to realize the steps of the method of the first aspect of the present disclosure.

In a fifth aspect, the present disclosure provides a user terminal which includes a memory and a processor. The memory stores a computer program, and the processor is configured to execute the computer program in the memory to realize the steps of the method of the first aspect of the present disclosure.

In a sixth aspect, the present disclosure provides a computer-readable storage medium storing a computer program. The program, when executed by a processor, realizes the steps of the method of the first aspect of the present disclosure.

On the basis of the above-mentioned technical solutions, at least the following technical effects may be achieved: by means of verifying the root evidence and the verification evidence of the server-side program, the server-side program is determined to be the program that is not modified and is operated in the TEE, thereby ensuring that the data processing method of the server-side program satisfies the data processing rule and data used or generated when the server-side program is operated will not be read by other programs, which improves the security of information in the server-side program.

Other features and advantages of the present disclosure will be described in detail in the following specific implementation modes.

BRIEF DESCRIPTION OF THE DRAWINGS

The accompanying drawings are used to provide a further understanding of the present disclosure, and constitute a part of the description. They are used to explain the present disclosure together with the following specific implementation modes, but do not constitute a limitation to the present disclosure. In the drawings.

DETAILED DESCRIPTION OF EXAMPLE EMBODIMENTS

Specific implementation modes of the present disclosure will be described in detail below with reference to the accompanying drawings. It should be understood that the specific implementation modes described herein are only used to illustrate and explain the present disclosure, and are not intended to limit the present disclosure.

An implementation scenario of the present disclosure is described at first. Online services in the present disclosure are mainly realized by cooperation of the server-side program and the user-side program. Instructions, information, and other data of a user are collected through the user-side program and are transmitted to the server-side program, and processing results are obtained by processing, by the server-side program, the instructions of the user. It is worth noting that there may be a plurality of user-side programs in one online service system. For example, when the online service system is a conference system, audiovisual information of all participants may be collected through the plurality of user-side programs, respectively, and are sent to the server-side program. The server-side program integrates and processes the audiovisual information of all the participants, and transmits processed audios and videos to all the user-side programs, so as to complete a conference service.

Figure 1:
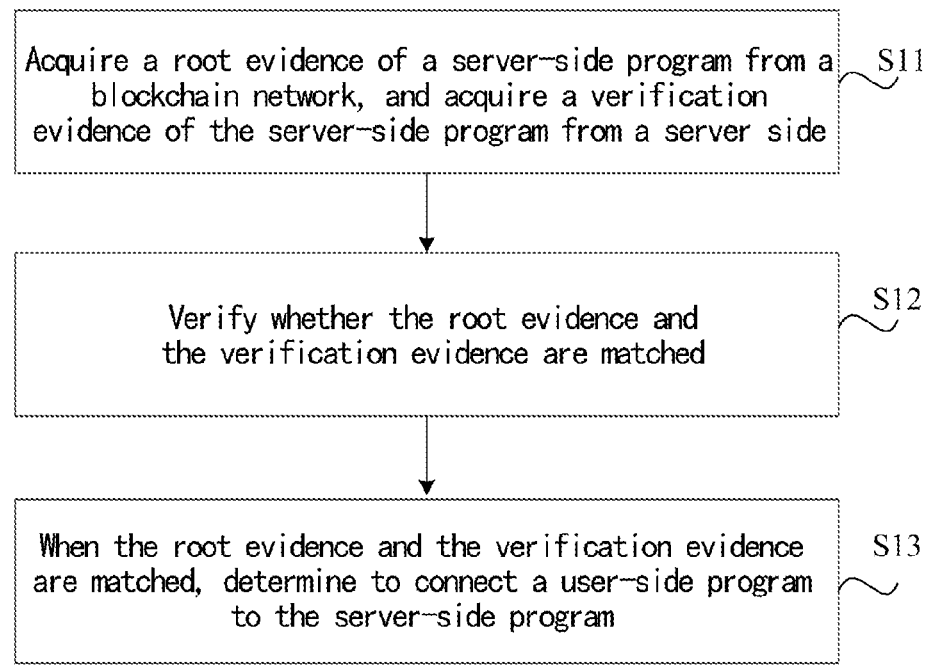
FIG. 1 is a flowchart of a program verification method illustrated according to an exemplarily disclosed embodiment.

FIG. 1 is a flowchart of a program verification method illustrated according to an exemplarily disclosed embodiment. As shown in FIG. 1, the method includes the following steps.

At S11, a root evidence of a server-side program is acquired from a blockchain network, and a verification evidence of the server-side program is acquired from a server side.

The root evidence is written into the blockchain network after server-side program review succeeds, and the success of the server-side program review at least indicates that a data processing method of the server-side program satisfies a preset data processing rule.

The data processing rule may include whether to store data, whether to export data, and the like. The data processing rule may be set according to an agreement between a service provider and a user.

The server-side program review may be carried out by the user or jointly carried out by the user and the service provider, or may be carried out by an authentication platform of a third party. The server-side program review may be realized through a data detection program. When the data detection program determines that a data processing method of the server-side program satisfies the preset data processing rule, it is determined that the server-side program review succeeds.

In one possible implementation mode, the above-mentioned verification evidence may be calculated, on the basis of the server-side program, by a trusted execution environment (TEE) and generated after the server-side program passes through legality verification and integrity verification of the TEE.

Since a verification mechanism provided by the TEE is different, in another possible implementation mode, the verification evidence includes a server-side verification evidence and a TEE evidence. The server-side verification evidence is calculated and obtained, on the basis of the server-side program, by a designated program of the server side or a program of a authentication platform, and is subjected to matching verification with the root evidence, so as to prove that the server-side program is not modified; and the TEE evidence is generated after the TEE performs legality verification and integrity verification on an operation code and data of the server-side program, so as to prove that the server-side program is operated in the TEE.

Considering that a service function of the online service system may have a need for update, and each program update will change the verification evidence calculated and obtained by the program, in one possible implementation mode, after the program update, an updated server-side program is reviewed, a root evidence of the server-side program is calculated after the review succeeds, and the root evidence is stored into the blockchain network. In this way, the problem of a verification failure caused by the program update may be avoided.

At S12, whether the root evidence and the verification evidence are matched is verified.

The root evidence and the verification evidence being matched indicates that the server-side program is a program that is operated in the TEE of a computer and is not modified after the root evidence is written into the blockchain network.

In the present disclosure, the root evidence is written into the blockchain network. Due to the characteristic that data in the blockchain network is hard to tamper, it may be ensured that the root evidence is not modified. The root evidence and the verification evidence are both calculated and obtained on the basis of the server-side program. After the server-side program is modified, the generated verification evidence will not be matched with the root evidence pre-stored in the blockchain network. On the basis of the above-mentioned verification mechanism, it may be ensured that the server-side program is not modified after the server-side program review succeeds. That is to say, at the moment when the verification succeeds, the data processing method of the server-side program satisfies the preset data processing rule. In one possible implementation mode, the root evidence and the verification evidence may be generated and verified in the form of hash values.

The server-side program in the present disclosure is a program operated in the TEE (Trusted Execution Environment). The TEE is a secure zone in a processor, which provides a secure isolated operation environment for the operation of a program, so that it may be ensured that codes and data operated in it are not illegally acquired by external software (including an operating system, a basic input/output system (BIOS), etc.) or hardware (including other zones of the processor). The TEE may be realized through ARM TrustZone, Intel SGX, etc. at present. The server side has no way to acquire intermediate data from the program operated in the TEE, and cannot export or store the data processed by the server-side program, so that the user information security in the data operation process may be guaranteed, and it may be verified by the verification evidence whether the server-side program is a program operated in the TEE.

That is to say, by means of verifying whether the root evidence and the verification evidence are matched, it may be determined that the server-side program is the program that is not modified after the review and satisfies the data processing rule, and it may be determined that the server-side program is the program that is operated in the TEE and its data will not be called by external programs.

At S13, when the root evidence and the verification evidence are matched, it is determined to connect a user-side program to the server-side program.

When the root evidence and the verification evidence are matched, it may be determined that the server-side program is the program that is not modified after the review, satisfies the data processing rule, and is operated in the TEE, and its data will not be called by external programs, so that it may be determined to connect the user-side program to the server-side program to realize online services.

In one possible implementation mode, before it is determined to connect the user-side program to the server-side program, the user-side program may be further verified. Specifically, a current abstract of the user-side program is acquired, and a pre-stored abstract of the user-side program is acquired from the blockchain network; whether the current abstract and the pre-stored abstract are matched is verified; and when the current abstract and the pre-stored abstract are matched and the root evidence and the verification evidence are matched, it is determined to connect the user-side program to the server-side program.

The pre-stored abstract is written into the blockchain network after user-side program review succeeds; the success of the user-side program review at least indicates that a data acquisition method of the user-side program satisfies a preset data acquisition rule; and the current abstract and the pre-stored abstract being matched indicates that the user-side program is a program that is not modified after the pre-stored abstract is written into the blockchain network. The pre-stored abstract and the current abstract may be respectively a hash value when the user-side program undergoes the program review, and a current hash value. Considering that an application program update will cause an abstract to change, after each user-side program update, the authentication platform can re-review the user-side program and write an updated abstract into the blockchain network as a new pre-stored abstract.

Since the pre-stored abstract is stored in the blockchain network, the pre-stored abstract may be ensured not to be modified. The current abstract and the pre-stored abstract being matched can prove that a data acquisition rule of the current user-side program to be operated satisfies the preset data acquisition rule. By means of the above-mentioned mechanism, illegal acquisition of user data by the user-side program may be avoided.

In one possible implementation mode, the user-side program and the server-side program are connected through an encrypted transmission channel In this way, security of user data may be protected from three aspects: data acquisition, data transmission, and data processing, so as to prevent leakage of user information.

It is worth noting that the user-side program may be verified through an initiator (for example, a launcher) of a user terminal or through a built-in verification module of a user program or through a verification program of the user terminal, or the current abstract of the user-side program is sent to the authentication platform for verification by the authentication platform. The present disclosure does not limit this.

This method may be implemented in response to a user's launching operation for the user-side program. For example, in response to a user's operation of launching the user-side program, the server-side program or the user-side program and the server-side program may be verified through the above method, and after the verification succeeds, the user-side program and the server-side program are connected. This method may be also implemented in response to a user's request operation for an online server. For example, when the user-side program is a chat program, after the chat program is launched, in response to a user's operation of clicking a chat window, the above method is executed to verify the server-side program or verify the server-side program and the user-side program.

On the basis of the above-mentioned technical solutions, at least the following technical effects may be achieved: by means of verifying the root evidence and the verification evidence of the server-side program, the server-side program is determined to be the program that is not modified and is operated in the TEE, thereby ensuring that the data processing method of the server-side program satisfies the data processing rule and data used or generated when the server-side program is operated will not be read by other programs, which improves the security of information in the server-side program.

Figure 2:
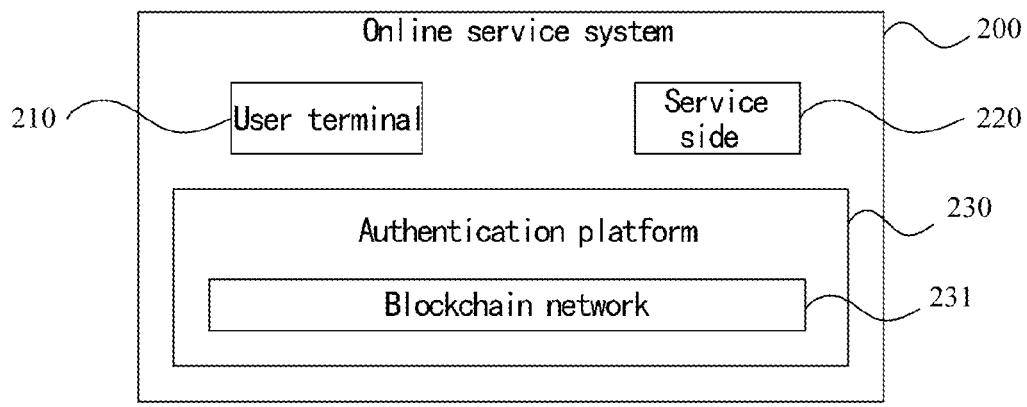
FIG. 2 is a block diagram of an online service system illustrated according to an exemplarily disclosed embodiment.

FIG. 2 is a block diagram of an online service system illustrated according to an exemplarily disclosed embodiment. As shown in FIG. 2, the online service system 200 includes a user terminal 210, a server side 220, and an authentication platform 230. The authentication platform includes a blockchain network 231.

Figure 3:
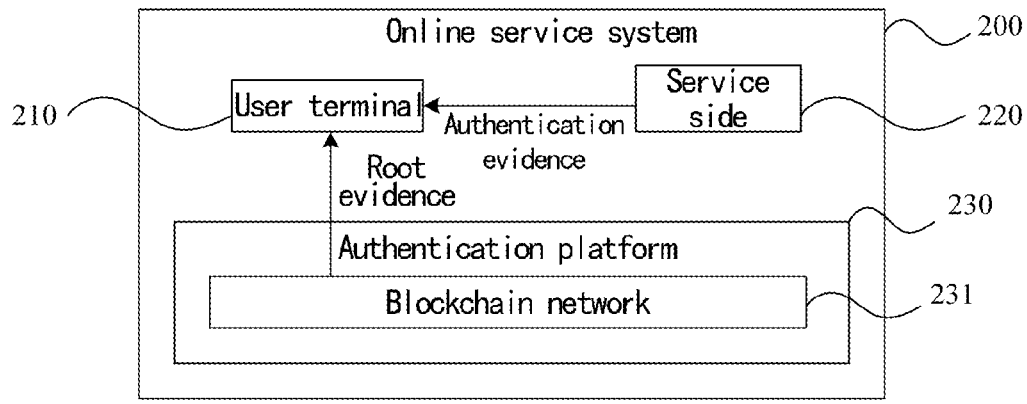
FIG. 3 is a schematic diagram of verification through a user terminal illustrated according to an exemplarily disclosed embodiment.

In one possible implementation mode, as shown in FIG. 3, the user terminal 210 may be connected with the server side 220 and the authentication platform 230 and may acquire a root evidence of a server-side program from the authentication platform 230, acquire a verification evidence of the server-side program from the server side, verify whether the root evidence and the verification evidence are matched, and determine, when the root evidence and the verification evidence are matched, to connect a user-side program to the server-side program.

The root evidence is written into the blockchain network after server-side program review succeeds, and the success of the server-side program review at least indicates that a data processing method of the server-side program satisfies a preset data processing rule. The root evidence and the verification evidence being matched indicates that the server-side program is a program that is operated in a TEE of a computer and is not modified after the root evidence is written into the blockchain network.

In one possible implementation mode, the user terminal 210 may further acquire a current abstract of the user-side program, acquire a pre-stored abstract stored in the blockchain network 231 from the authentication platform 230, verify whether the current abstract and the pre-stored abstract are matched, and determine, when the current abstract and the pre-stored abstract are matched and the root evidence and the verification evidence are matched, to connect the user-side program to the server-side program.

The pre-stored abstract is written into the blockchain network after user-side program review succeeds; the success of the user-side program review at least indicates that a data acquisition method of the user-side program satisfies a preset data acquisition rule; and the current abstract and the pre-stored abstract being matched indicates that the user-side program is a program that is not modified after the pre-stored abstract is written into the blockchain network.

It is worth noting that the verification of the pre-stored abstract and the current abstract may be carried out by a initiator in the user terminal 210, or may be carried out by other programs in the user terminal, or may be realized by self-detection of the user-side program.

In the above implementation mode, the verification of the server-side program and the verification of the user-side program are both carried out by the user terminal. However, in the present disclosure, the verification of the server-side program and the user-side program may also be carried out by the authentication platform. Or, the user terminal verifies the server-side program, and the authentication platform verifies the user-side program. Or, the authentication platform verifies the server-side program, and the user terminal verifies the user-side program. That is, the present disclosure does not limit an implementation main body in which the server-side program and the user-side program are verified.

Figure 4:
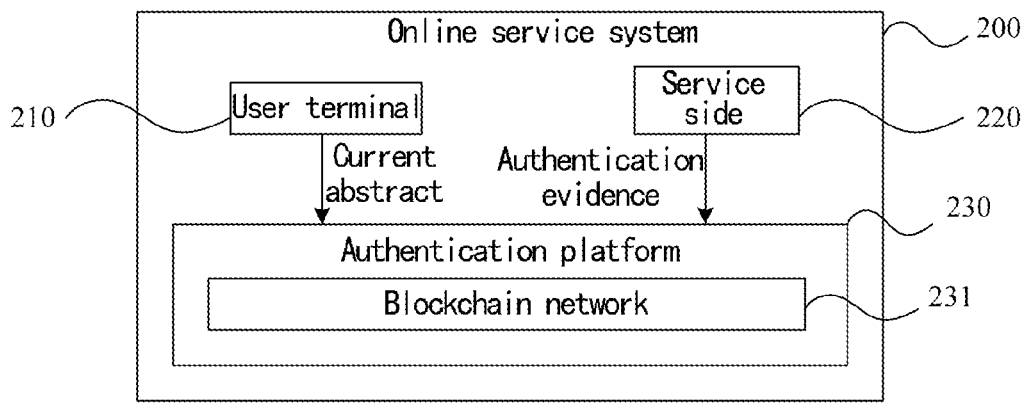
FIG. 4 is a schematic diagram of verification through an authentication platform illustrated according to an exemplarily disclosed embodiment.

For example, as shown in FIG. 4, the authentication platform 230 may be connected with the user terminal 210 and the server side 220, can acquire the current abstract of the user-side program from the user terminal 210, acquire an authentication evidence of the server-side program from the server side, call the pre-stored abstract of the user-side program and the root evidence of the server-side program from the blockchain network 231, respectively verify whether the root evidence and the authentication evidence are matched and whether the pre-stored abstract and the current abstract are matched, and determine, when both the match verifications succeeds, to connect the server-side program to the user-side program.

The above authentication process may be carried out in response to a user's launching operation for the user-side program. For example, in response to a user's operation of launching the user-side program, a program verification request is generated, and a device for verifying the user-side program verifies the user-side program on the basis of the above verification request, and a device for verifying the server-side program verifies the server-side program on the basis of the above verification request; and after the two verifications succeeds, the user-side program and the server-side program are connected. The above verification process may also be carried out in response to a user's request operation for a chat program. After the chat program is launched, in response to a user's operation of clicking a chat window, the above verification request is generated.

In one possible implementation mode, the user-side program and the server-side program are connected through an encrypted transmission channel In this way, security of user data may be protected from three aspects: data acquisition, data transmission, and data processing, so as to prevent leakage of user information.

Considering that an application program will be updated, the authentication platform may review the updated program after the user-side program or the server-side program are updated, and update, after the review succeeds, the pre-stored abstract or the root evidence.

The specific steps of verifying the programs by the user terminal or the authentication platform in the above embodiment have been described in detail in the embodiment of the authentication method, and will not be elaborated here.

On the basis of the above-mentioned technical solutions, at least the following technical effects may be achieved: by means of verifying the root evidence and the verification evidence of the server-side program, the server-side program is determined to be the program that is not modified and is operated in the TEE, thereby ensuring that the data processing method of the server-side program satisfies the data processing rule and data used or generated when the server-side program is operated will not be read by other programs, which improves the security of information in the server-side program.

Figure 5:
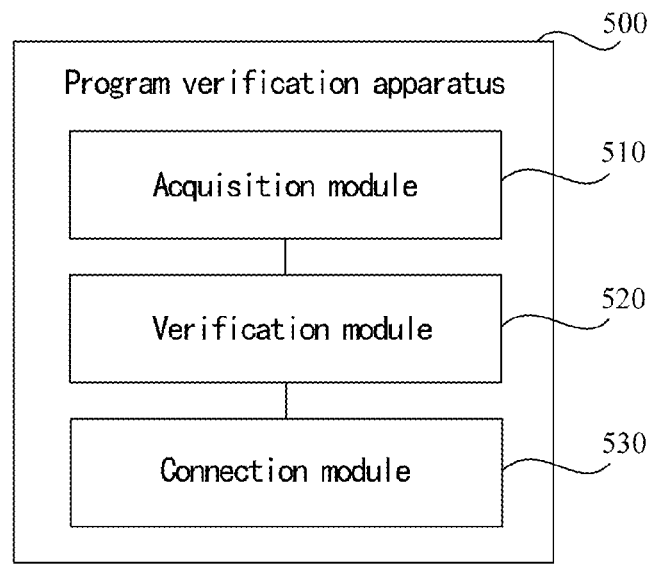
FIG. 5 is a block diagram of a program verification apparatus illustrated according to an exemplarily disclosed embodiment.

FIG. 5 is a block diagram of a program verification apparatus illustrated according to an exemplarily disclosed embodiment. As shown in FIG. 5, the apparatus 500 includes:

an acquisition module 510 configured to acquire a root evidence of a server-side program from a blockchain network, and acquire a verification evidence of the server-side program from a server side, where the root evidence is written into the blockchain network after server-side program review succeeds, and the success of the server-side program review at least indicates that a data processing method of the server-side program satisfies a preset data processing rule;

a verification module 520 configured to verify whether the root evidence and the verification evidence are matched, where the root evidence and the verification evidence being matched indicates that the server-side program is a program that is operated in a TEE of a computer and is not modified after the root evidence is written into the blockchain network; and a connection module 530 configured to, when the root evidence and the verification evidence are matched, determine to connect a user-side program to the server-side program.

Alternatively, the apparatus further includes:

an abstract acquisition module configured to acquire a current abstract of the user-side program, and acquire a pre-stored abstract of the user-side program from the blockchain network, where the pre-stored abstract is written into the blockchain network after user-side program review succeeds, and the success of the user-side program review at least indicates that a data acquisition method of the user-side program satisfies a preset data acquisition rule; and an abstract authentication module configured to verify whether the current abstract and the pre-stored abstract are matched, where the current abstract and the pre-stored abstract being matched indicates that the user-side program is a program that is not modified after the pre-stored abstract is written into the blockchain network.

The connection module 530 is configured to, when the current abstract and the pre-stored abstract are matched and the root evidence and the verification evidence are matched, determine to connect the user-side program to the server-side program.

As for the apparatus in the above example, a specific method used by each module to execute operations has been described in detail in the example of the method, and will not be elaborated here.

On the basis of the above-mentioned technical solutions, at least the following technical effects may be achieved: by means of verifying the root evidence and the verification evidence of the server-side program, the server-side program is determined to be the program that is not modified and is operated in the TEE, thereby ensuring that the data processing method of the server-side program satisfies the data processing rule and data used or generated when the server-side program is operated will not be read by other programs, which improves the security of information in the server-side program.

Figure 6:
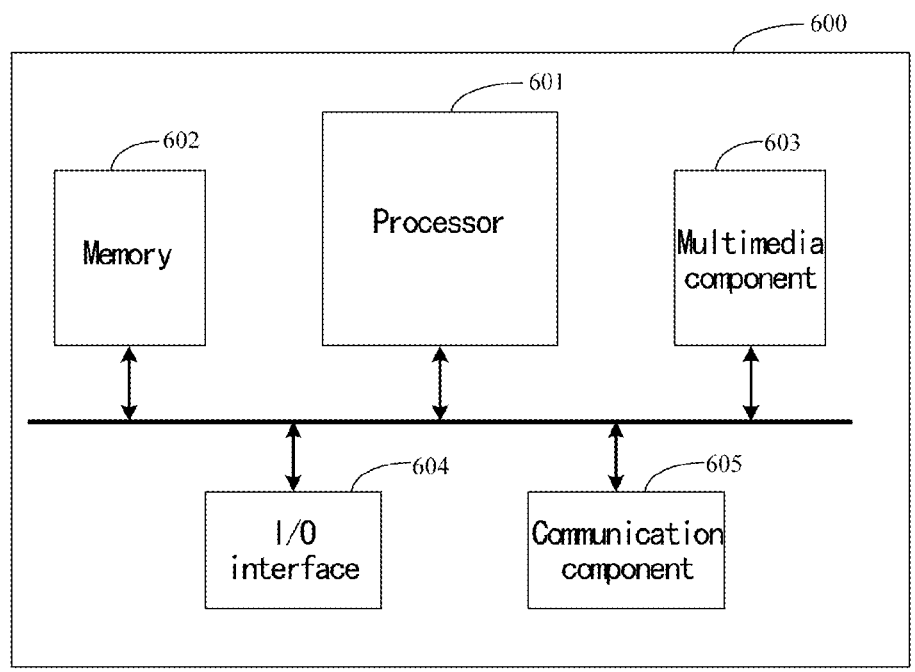
FIG. 6 is a block diagram of an electronic device illustrated according to an exemplary embodiment.

FIG. 6 is a block diagram of an electronic device 600 illustrated according to an exemplary embodiment. As shown in FIG. 6, the electronic device 600 may be a user terminal in an online service system, and includes a processor 601 and a memory 602. The electronic device 600 may further include one or more of a multimedia component 603, an input/output (I/O) interface 604, and a communication component 605.

The processor 601 is configured to control the overall operation of the electronic device 600 to complete all or part of the steps in the program verification method described above. The memory 602 is configured to store various types of data to support operations on the electronic device 600. These data may include, for example, instructions for any applications or method operated on the electronic device 600, as well as application-related data, such as contact data, messages sent and received, pictures, audio, and video. The memory 602 may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk. The multimedia component 603 may include a screen and an audio component. The screen may be a touch screen, for example, and the audio component is used to output and/or input audio signals. For example, the audio component may include a microphone, which is used to receive external audio signals. The received audio signal may be further stored in the memory 602 or transmitted via the communication component 605. The audio component further includes at least one speaker used to output audio signals. The I/O interface 604 provides an interface between the processor 601 and other interface modules. The other interface modules may be a keyboard, a mouse, a button, etc. These buttons may be virtual buttons or physical buttons. The communication component 605 is used to perform wired or wireless communication between the electronic device 600 and other devices. Wireless communication, such as Wi-Fi, Bluetooth, Near Field Communication (NFC), 2G, 3G, 4G, NB-IOT, eMTC, or other 5G, or a combination of one or more of them, is not limited here.

Therefore, the corresponding communication component 605 may include: a Wi-Fi module, a Bluetooth module, an NFC module, and so on.

In one exemplary embodiment, the electronic device 600 may be realized by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic elements, and is used to implement the above-mentioned program verification method.

In another exemplary embodiment, a computer-readable storage medium is further provided, including program instructions that, when executed by a processor, implement the steps of the program verification method described above. For example, the computer-readable storage medium may be the foregoing memory 602 including program instructions, and the foregoing program instructions may be executed by the processor 601 of the electronic device 600 to complete the foregoing program verification method.

Figure 7:
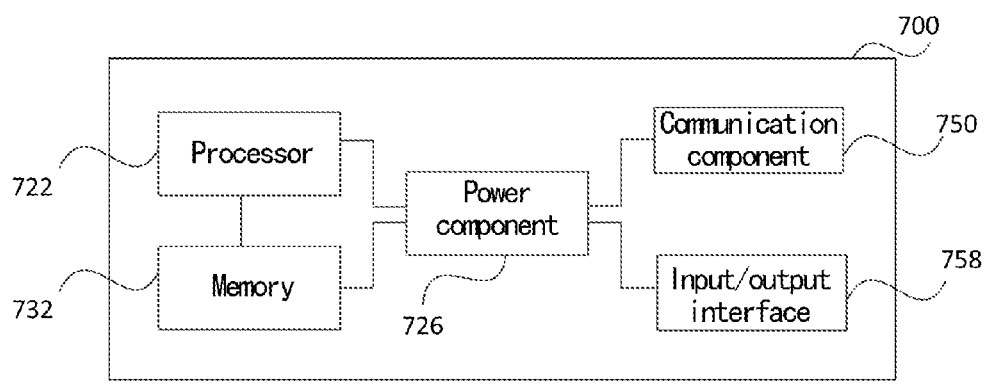
FIG. 7 is a block diagram of an electronic device illustrated according to an exemplary embodiment.

FIG. 7 is a block diagram of an electronic device 700 illustrated according to an exemplary embodiment. For example, the electronic device 700 may be provided as an authentication platform in an online service system, or may be a server side in an online service system. Referring to FIG. 7, the electronic device 700 includes a processor 722, the number of which may be one or more, and a memory 732 configured to store a computer program executable by the processor 722. The computer program stored in the memory 732 may include one or more modules each corresponding to a set of instructions. In addition, the processor 722 may be configured to execute the computer program to implement the above-mentioned program verification method.

In addition, the electronic device 700 may further include a power supply component 726 and a communication component 750. The power supply component 726 may be configured to perform power management on the electronic device 700, and the communication component 750 may be configured to implement the communication of the electronic device 700, for example, wired or wireless communication. In addition, the electronic device 700 may further include an input/output (I/O) interface 758. The electronic device 700 can operate an operating system stored in the memory 732, such as Windows Server™, Mac OS X™, Unix™, and Linux™.

In another exemplary embodiment, a computer-readable storage medium is further provided, including program instructions that, when executed by a processor, implement the steps of the program verification method described above. For example, the computer-readable storage medium may be the foregoing memory 732 including program instructions, and the foregoing program instructions may be executed by the processor 722 of the electronic device 700 to complete the foregoing program verification method.

In another exemplary example, a computer program product is further provided. The computer program product includes a computer program that may be executed by a programmable apparatus. The computer program has a code part that is configured to, when executed by the programmable apparatus, implement the above program verification method.

The preferable implementation modes of the present disclosure are described above in detail with reference to the accompanying drawings. However, the present disclosure is not limited to the specific details in the foregoing implementation modes. Various simple variations may be made to the technical solutions of the present disclosure within the technical concept ranges of the present disclosure, and these simple variations all fall within the protection scope of the present disclosure.

In addition, it should be noted that the various specific technical features described in the above specific implementation modes may be combined in any suitable manner without contradiction. In order to avoid unnecessary repetition, various possible combination modes will not be additionally described in the present disclosure. In addition, various different implementation modes of the present disclosure can also be arbitrarily combined, and these combinations should also be regarded as the content disclosed in the present disclosure, as long as they do not violate the idea of the present disclosure.

What is claimed is:

1. A program verification method, comprising:
    acquiring a root evidence of a server-side program from a blockchain network, and acquiring a verification evidence of the server-side program from a server side, wherein the root evidence is written into the blockchain network after server-side program review succeeds, and the success of the server-side program review at least indicates that a data processing method of the server-side program satisfies a preset data processing rule;
    verifying whether the root evidence and the verification evidence are matched, wherein the root evidence and the verification evidence being matched indicates that the server-side program is a program that is operated in a trusted execution environment of a computer and is not modified after the root evidence is written into the blockchain network; and
    when the root evidence and the verification evidence are matched, determining to connect a user-side program to the server-side program.

2. The method according to claim 1, wherein the method further comprises:
    acquiring a current abstract of the user-side program, and acquiring a pre-stored abstract of the user-side program from the blockchain network, wherein the pre-stored abstract is written into the blockchain network after user-side program review succeeds, and the success of the user-side program review at least indicates that a data acquisition method of the user-side program satisfies a preset data acquisition rule; and
    verifying whether the current abstract and the pre-stored abstract are matched, wherein the current abstract and the pre-stored abstract being matched indicates that the user-side program is a program that is not modified after the pre-stored abstract is written into the blockchain network;
    and when the root evidence and the verification evidence are matched, the determining to connect the user-side program to the server-side program comprises:
    when the current abstract and the pre-stored abstract are matched and the root evidence and the verification evidence are matched, determining to connect the user-side program to the server-side program.

3. An online service system, comprising: a user terminal, a server side, and an authentication platform, wherein the authentication platform comprises a blockchain network;
    the authentication platform is configured to perform server-side program review on a server-side program, and store, when the server-side program review succeeds, a root evidence of the server-side program into the blockchain network; the success of the server-side program review at least indicates that a data processing method of the server-side program satisfies a preset data processing rule;

the authentication platform or the user terminal is configured to acquire the root evidence of the server-side program from the blockchain network, acquire a verification evidence of the server-side program from the server side, verify whether the root evidence and the verification evidence are matched, and determine, when the root evidence and the verification evidence are matched, to connect a user-side program to the server-side program;

the user terminal is configured to operate the user-side program, and the server side is configured to operate the server-side program;

wherein the root evidence and the verification evidence being matched indicates that the server-side program is a program that is operated in a trusted execution environment of a computer and is not modified after the root evidence is written into the blockchain network.

4. The system according to claim 3, wherein the authentication platform is further configured to perform user-side program review on the user-side program, and store, when the user-side program review succeeds, an abstract of the user-side program into the blockchain network as a pre-stored abstract; the success of the user-side program review at least indicates that a data acquisition method of the user-side program satisfies a preset data acquisition rule;

the authentication platform or the user terminal is further configured to acquire the current abstract of the user-side program, acquire the pre-stored abstract of the user-side program from the blockchain network, verify whether the current abstract and the pre-stored abstract are matched, and determine, when the current abstract and the pre-stored abstract are matched and the root evidence and the verification evidence are matched, to connect the user-side program to the server-side program, wherein the current abstract and the pre-stored abstract being matched indicates that the user-side program is a program that is not modified after the pre-stored abstract is written into the blockchain network.

5. The system according to claim 4, wherein the user terminal comprises an initiator, and wherein the initiator is configured to calculate the abstract of the user-side program, acquire the pre-stored abstract of the user-side program from the blockchain network, verify whether the current abstract and the pre-stored abstract are matched, and launch, when the current abstract and the pre-stored abstract are matched, the user-side program in the user terminal.

6. The system according to claim 3, wherein the user-side program and the server-side program are connected through an encrypted transmission channel.

7. A program verification apparatus, comprising:

an acquisition module configured to acquire a root evidence of a server-side program from a blockchain network, and acquire a verification evidence of the server-side program from a server side, wherein the root evidence is written into the blockchain network after server-side program review succeeds, and the success of the server-side program review at least indicates that a data processing method of the server-side program satisfies a preset data processing rule;

a verification module configured to verify whether the root evidence and the verification evidence are matched, wherein the root evidence and the verification evidence being matched indicates that the server-side program is a program that is operated in a trusted execution environment of a computer and is not modified after the root evidence is written into the blockchain network; and a connection module configured to, when the root evidence and the verification evidence are matched, determine to connect a user-side program to the server-side program.

8. An authentication platform, comprising:

a memory storing a computer program containing instructions therein;

a processor configured to execute the instructions to cause the authentication platform to perform the program verification method according to claim 1.

9. A user terminal, comprising:

a memory storing a computer program containing instructions therein;

a processor configured to execute the instructions to cause the user terminal to perform the program verification method according to claim 1.

10. A non-transitory computer-readable storage medium, storing a computer program containing instructions therein, wherein the instructions, when executed by a processor to cause the non-transitory computer-readable storage medium to perform the program verification method according to claim 1.

* * * * *